(12) United States Patent
Bang et al.

(10) Patent No.: US 11,641,019 B1
(45) Date of Patent: May 2, 2023

(54) FUEL CELL SYSTEM, AND METHOD OF ITS OPERATION

(71) Applicant: BLUE WORLD TECHNOLOGIES HOLDING APS, Aalborg Ost (DK)

(72) Inventors: Mads Bang, Stovring (DK); Deni Maric, Aalborg (DK); Fan Zhou, Klarup (DK); Martin Stenild Grøn, Skals (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 0 days.

(21) Appl. No.: 17/917,630

(22) PCT Filed: Mar. 31, 2021

(86) PCT No.: PCT/DK2021/050096
§ 371 (c)(1),
(2) Date: Oct. 7, 2022

(87) PCT Pub. No.: WO2021/204336
PCT Pub. Date: Oct. 14, 2021

(30) Foreign Application Priority Data

Mar. 31, 2021 (DK) .............................. PA2020-00398

(51) Int. Cl.
| | |
|---|---|
| *H01M 8/04029* | (2016.01) |
| *B60L 58/26* | (2019.01) |
| *B60L 58/33* | (2019.01) |
| *H01M 8/0432* | (2016.01) |
| *H01M 8/04007* | (2016.01) |
| *H01M 8/04302* | (2016.01) |
| *H01M 8/04746* | (2016.01) |
| *B60L 58/40* | (2019.01) |

(52) U.S. Cl.
CPC ......... *H01M 8/04029* (2013.01); *B60L 58/26* (2019.02); *B60L 58/33* (2019.02); *B60L 58/40* (2019.02); *H01M 8/04067* (2013.01); *H01M 8/04302* (2016.02); *H01M 8/04358* (2013.01); *H01M 8/04768* (2013.01); *H01M 2250/20* (2013.01)

(58) Field of Classification Search
CPC ........... B60L 58/26; B60L 58/33; B60L 58/40
See application file for complete search history.

(56) References Cited

U.S. PATENT DOCUMENTS

| | | |
|---|---|---|
| 9,136,549 B2 | 9/2015 | Vollmer et al. |
| 2009/0249802 A1 | 10/2009 | Nemesh et al. |
| 2013/0022888 A1 | 1/2013 | Vollmer et al. |

(Continued)

FOREIGN PATENT DOCUMENTS

| | | |
|---|---|---|
| CN | 109962268 A | 7/2019 |
| DE | 102013218092 A1 | 3/2015 |

(Continued)

OTHER PUBLICATIONS

International Search Report for PCT/DK2021/050096 prepared by the Nordic Patent Institute, dated Jun. 16, 2021, 3 pages.

*Primary Examiner* — Adam A Arciero
(74) *Attorney, Agent, or Firm* — Brooks Kushman P.C.; John E. Nemazi

(57) ABSTRACT

A fuel cell system having a fuel cell cooling circuit coupled to a battery cooling circuit through a coolant/coolant heat exchanger for removing heat from the fuel cell cooling circuit through the battery cooling circuit during normal steady state operation of the fuel cell system.

19 Claims, 2 Drawing Sheets

(56) References Cited

U.S. PATENT DOCUMENTS

Figure 1:
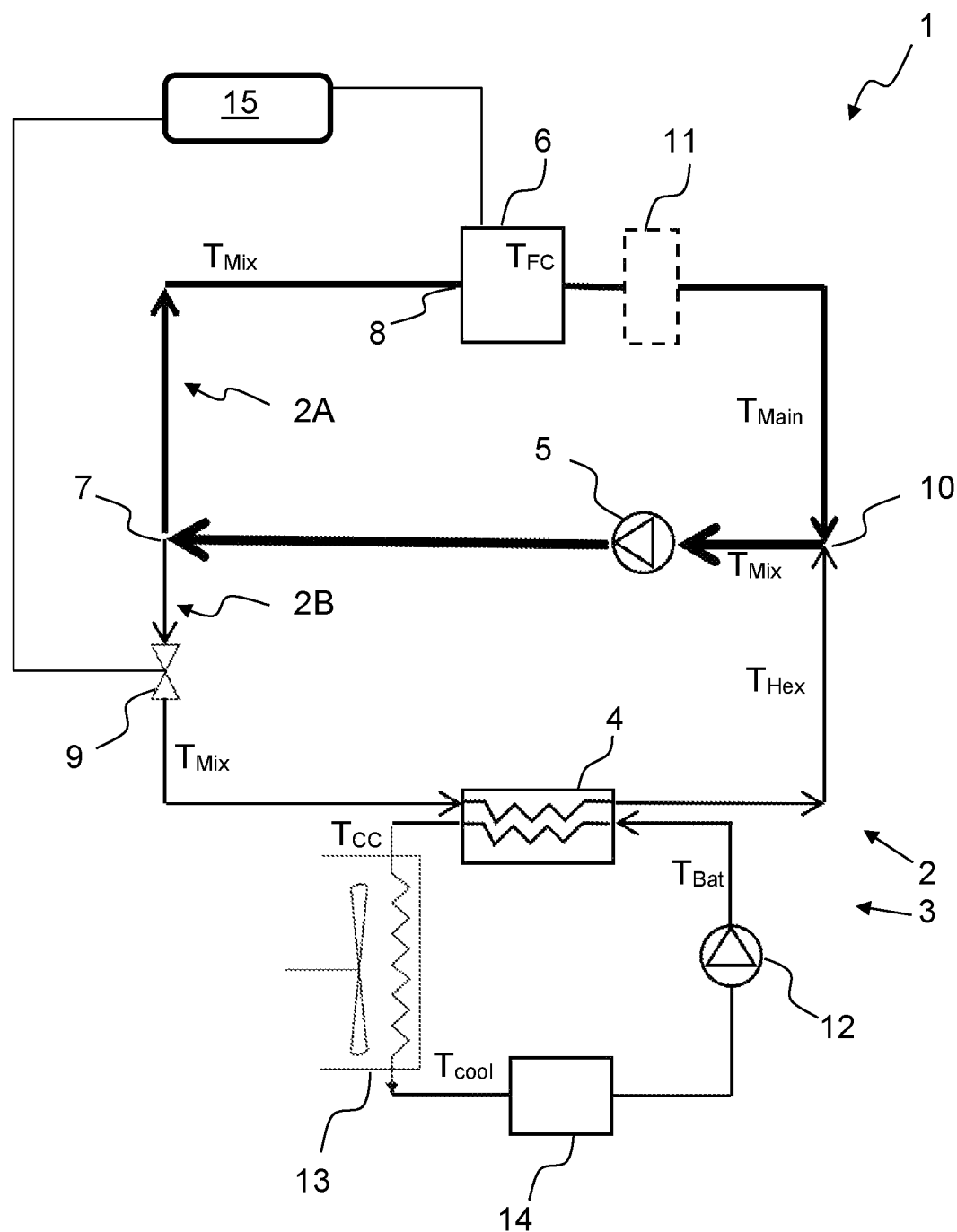

2013/0078486 A1    3/2013   Chou et al.
2014/0147764 A1    5/2014   Chikugo et al.
2019/0123406 A1    4/2019   Yamamura

FOREIGN PATENT DOCUMENTS

| DE | 102015012108 A1 | 3/2017 |
| DE | 102015225700 A1 | 6/2017 |
| DE | 102018002708 A1 | 10/2018 |
| KR | 20070059644 A | 6/2007 |
| WO | 2017092853 A1 | 6/2017 |
| WO | 2017102449 A1 | 6/2017 |
| WO | 2017148487 A1 | 9/2017 |
| WO | 2019170818 A1 | 9/2019 |

FUEL CELL SYSTEM, AND METHOD OF ITS OPERATION

CROSS-REFERENCE TO RELATED APPLICATION

This application is the U.S. national phase of PCT Application No. PCT/DK2021/050096 filed on Mar. 31, 2021, which claims priority to DK Patent Application No. PA 2020 00398 filed on Apr. 7, 2020, the disclosures of which are incorporated in their entirety by reference herein.

FIELD OF THE INVENTION

The present invention relates to cooling of fuel cells, especially high temperature polymer electrolyte membrane fuel cells. In particular, it relates to a fuel cell system and method of its operation as well as use of it.

BACKGROUND OF THE INVENTION

Fuel cells generate heat during their operation, which has to be removed in order to keep the temperature in an optimum range. For example, high temperature polymer electrolyte membrane (HT-PEM) fuel cells, also called polymer exchange membrane fuel cells have operation temperatures in the temperature range of 120-200° C., for example around 170° C. For controlling the temperature, especially when used in vehicles, radiators are often used as heat exchangers where an ambient air flow is cooling the fuel cell coolant.

In vehicles, another problem occurs, which is the low performance of batteries at low temperatures, especially at freezing temperatures.

A solution to this problem is proposed in U.S. patent application US2013/0022888, issued as patent US9136549, where the fuel cell is cooled by one cooling circuit with corresponding radiator, and the batteries are cooled by a second, independent cooling circuit with corresponding radiator, and where the two cooling circuits are coupled when there is a necessity for warming the batteries, in which case heat is transferred through a heat exchanger from the fuel cell cooling circuit to the battery cooling circuit. When the battery needs no heating, the flow through the heat exchanger is discontinued by closing a shut off valve.

Also, WO2017/092853 discloses a thermal coupling of the fuel cell cooling circuit with the battery cooling circuit in order to heat the battery in case of low ambient temperatures. However, after startup, flow of battery coolant through the thermally coupling heat exchanger is stopped.

Other combinations of cooling circuits for fuel cells and batteries are discussed in WO2017/102449, US2019/0123406, and US2013/0078486, Chinese patent application CN109962268A, and German patent publications DE102018002708A1, DE102013218092A1, and DE102015012108A1.

In vehicles, it is important that the cooling system is kept relatively compact and minimizes weight. This is discussed in WO2017/148487 by SerEnergy for HT-PEM fuel cells, in particular in vehicles, wherein a minor side branch of the fuel cell cooling circuit is used to cool down a portion of the coolant. The side branch includes a radiator and an adjustment valve. The remaining part of the coolant, that is not flowing through the side branch, flows into a fuel evaporator upstream of the fuel cell, which also reduces the temperature of the coolant in the by-pass branch. Due to the fact that the coolant needs only to be cooled down from 170 to 160 degrees, the side branch can be dimensioned relatively small with only a minor portion of the coolant flowing through the side branch and then into the fuel cell after recombination of that major portion that flows through the evaporator and is cooled therein by heat transfer for fuel evaporation.

As illustrated by the examples above, there are ongoing efforts and needs for improvements of fuel cells systems for automobiles.

DESCRIPTION / SUMMARY OF THE INVENTION

It is therefore an object of the invention to provide an improvement in the art. In particular, it is an objective to provide a compact fuel cell system, for example for a vehicle. Another objective is to provide a compact cooling circuit for fuel cells operating at high temperature, for example a HT-PEM fuel cell system. One or more of these objectives are obtained by a fuel cell system and its method of operation as described in the claims and in more detail in the following.

In short, the fuel cell system comprises a fuel cell cooling circuit coupled to a separate battery cooling circuit through a coolant/coolant heat exchanger for removing heat from the fuel cell cooling circuit through the battery cooling circuit. In contrast to the above cited prior art, this heat transfer is done after the startup phase during normal steady state operation of the fuel cell system.

The fuel cell system comprises a fuel cell, typically a fuel cell stack. Herein, the term fuel cell is used for a single fuel cell as well as for multiple fuel cells, for example a fuel cell stack. The fuel cell comprises an anode side and a cathode side and a proton exchange membrane therein between for transport of hydrogen ions from the anode side to the cathode side through the membrane during operation. The fuel cell system is used to create electricity, for example for driving a vehicle, such as an automobile. In order to provide a buffer for the produced electricity, a battery system is provided in electrical connection with the fuel cell. The battery system is also used for delivering the necessary electricity in startup situations.

The fuel cell is of the type that operates at a high temperature. The term "high temperature" is a commonly used and understood term in the technical field of fuel cells and refers to operation temperatures above 120° C. in contrast to low temperature fuel cells operating at lower temperatures, for example at 70° C. Typically, the fuel cell operates in the temperature range of 120-200° C., for example in the range of 160 to 185° C.

For example, the fuel cell in the fuel cell system is a high temperature polymer electrolyte membrane fuel cell, (HT-PEM). The normal operating temperature of HT-PEM fuel cells is the range of 120° C. to 200° C., for example in the range of 160° C. to 185° C. The polymer electrolyte membrane PEM in the HT-PEM fuel cell is mineral acid based, typically a polymer film, for example polybenzimidazole doped with phosphoric acid. HT-PEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, especially for automobile industry.

Optionally, alcohol is used as part of the fuel for the fuel cell, for example a mix of methanol and water. In an evaporator, the fuel is evaporated before entering a heated reformer, in which the fuel is catalytically reacted into syngas for the fuel cell for providing the necessary hydrogen gas to the anode side of the fuel cell. As source for oxygen gas in the fuel cell, air is typically used and provided to the cathode side. The use of air is convenient for fuel cell systems for vehicles.

As the fuel cell operates at high temperatures, a coolant/coolant heat exchanger that takes heat from the fuel cell coolant is very efficient if the secondary coolant that takes up that heat operates at much lower temperature. In this case, there is only a necessity of a minor portion of the fuel cell coolant flowing through the heat exchanger. This is why radiators are typically used for cooling the coolant with a flow of ambient air, such as disclosed in WO2017/148487 and discussed therein for vehicles.

In the present invention, a minor portion of the fuel cell coolant is flowing through a coolant/coolant heat exchanger that is thermally coupled to a cooling circuit for the battery for heat transfer from the fuel cell coolant to the battery coolant. The coolant/coolant heat exchanger comprises a first flow area and a second flow area with a heat conducting separation wall in between. Accordingly, the first flow area is flow-connected to the fuel cell cooling circuit for flow of fuel cell coolant there through, and the second flow area is flow-connected to the battery cooling circuit for flow of battery coolant there through.

The battery cooling circuit and the battery coolant are separate from the fuel cell cooling circuit and the fuel cell coolant. The cooling circuit of the battery includes a thermal-energy-remover, typically comprising or being a radiator heat exchanger, for removing thermal energy from the battery coolant and thus for maintaining the steady state temperature $T_{Bat}$ of the battery during steady state normal operation after startup. The battery operates at a normal operation steady state temperature $T_{Bat}$, for example in the range of 20° C. to 60° C., optionally 20° C. to 40° C. or 40° C. to 60° C. The fuel cell operates during normal operation at a steady state temperature $T_{FC}$, for example at 175° C., in which case the battery coolant downstream of the battery at a normal operation steady state temperature $T_{Bat}$, which is substantially lower than $T_{FC}$, can be used efficiently to cool the fuel cell coolant down to a temperature which is typically 10-20 degrees lower than $T_{FC}$, for example 160° C. In order to achieve this, a minor portion of the fuel cell coolant flows through one side of the coolant/coolant heat exchanger, and the battery coolant through the other side of the coolant/coolant heat exchanger and takes up heat from the fuel cell coolant through the coolant-separating heat conducting wall in order to cool the fuel cell coolant. The minor portion of the fuel cell coolant that has the reduced temperature, for example close to $T_{Bat}$, is recombined with the remaining fuel cell coolant and mixed, before the fuel cell coolant is flowing into the fuel cell. In some embodiments, this is combined upstream of the pump that pumps the fuel cell coolant through the fuel cell cooling circuit and the minor portion through the heat exchanger. Downstream of the pump, the fuel cell coolant has the correct temperature for the fuel cell, and a portion is diverted through the heat exchanger to be cooled further down.

In steady state operation after startup, the steady state temperature $T_{FC}$ of the fuel cell is maintained by removing thermal energy from the fuel cell by transfer of thermal energy from the fuel cell coolant to the battery coolant continuously during normal operation after startup and removing the thermal energy from the battery coolant by the thermal-energy-remover, which also maintains the steady state temperature $T_{BAT}$ in the battery.

Notice in comparison with the prior art, that US9136549 emphasizes in column 6 lines 23-24 that that the battery cooling circuit is not heated continuously by the fuel cell coolant. This is so because US9136549 only applies the heat transfer for heating the battery in startup situations or when the temperature of the battery falls under a certain temperature limit. However, once the battery is heating itself, the flow from the fuel cell cooling circuit through the heat exchanger is stopped. This is different from the system described herein.

In some concrete embodiments, the thermal-energy-remover, for example radiator heat exchanger, is located in the battery cooling circuit downstream of the coolant/coolant heat exchanger and upstream of the battery and in flow direction between the coolant/coolant heat exchanger and the battery. This configuration is useful for cooling down the battery coolant downstream of the coolant/coolant heat exchanger by the thermal-energy-remover, for example radiator heat exchanger, before the battery coolant entering the battery.

In practice, during steady state operation of the fuel cell system, in a cooling cycle of the battery coolant in the battery cooling circuit, thermal energy is transferred from the battery to the battery coolant for maintaining the steady state temperature $T_{Bat}$ in the battery. For example, at this stage, just downstream of the battery, the coolant has a temperature $T_{Bat}$ in the range of 25° C. to 50° C., depending on the temperature of the battery during normal operation. Subsequently, further thermal energy is transferred from the fuel cell coolant to the battery coolant in the coolant/coolant heat exchanger, raising the temperature of the battery coolant, for example up to a temperature $T_{CC}$ in the range of 60° C. to 80° C. The battery coolant is then cooled down to reach a cooling temperature $T_{cool}$, for example a temperature $T_{cool}$ in the range of 20° C. to 30° C., by removing the thermal energy that has been taken up by the battery coolant from the battery and from the fuel cell coolant by using the thermal-energy-remover, for example radiator heat exchanger. This cooling down is done before the battery coolant with the cooling temperature $T_{cool}$ enters the battery again.

Obviously, the cooling temperature $T_{cool}$ is lower than $T_{Bat}$ in order for the coolant to take up thermal energy from the battery. Typically, $T_{cool}$ is at least 5 degrees, for example at least 10 degrees, lower than $T_{Bat}$, for example between 5 and 30 degrees lower, such as between 5 and 20 or 10 and 20 degrees lower.

For example, the thermal-energy-remover comprises or consists of a radiator heat exchanger for removal of thermal energy from the battery coolant by heat exchanger with ambient air. The release of thermal energy to ambient air is useful for vehicles, in particular. For example, if the outside temperature is below 20° C., the battery coolant can conveniently be cooled down to approximately such temperature.

For vehicles, it is also useful that the number of components is kept small due to weight and costs. For this reason, it is especially useful if only the battery cooling circuit but not the fuel cell cooling circuit comprises a radiator heat exchanger, so that thermal energy is removed from the fuel cell coolant by the battery coolant through the coolant/coolant heat exchanger. The steady state temperature $T_{FC}$ of the fuel cell is, thus, maintained by removing sufficient thermal energy from the fuel cell cooling circuit to the battery cooling circuit and by release of thermal energy from the battery cooling circuit through the thermal-energy-remover of the battery cooling circuit, for example the radiator heat exchanger.

The fuel cell cooling circuit comprises a pump for pumping the fuel cell coolant through the fuel cell cooling circuit.

In practical embodiments, the fuel cell cooling circuit comprises a main circuit and a side branch that are connected at a split point and a merge point, which is explained in more detail below. The main circuit comprises serial flow in the following order: from the pump to a split point, from the split point to the fuel cell, from the fuel cell to a merge point, from the merge point back to the pump. The side branch comprises serial flow in the following order: from the split point to the coolant/coolant heat exchanger and from the coolant/coolant heat exchanger to the merge point. It is pointed out, that the stated components are a minimum requirement and that there may be additional components in the coolant circuits, for example a fuel evaporator in the fuel cell cooling circuit. In practice, the fuel cell coolant is split into two portions at the split point with a first portion through the fuel cell and second portion through the heat exchanger. For example, the first portion is less than half of the second portion.

In some embodiment, a fuel evaporator is thermally coupled to the fuel cell cooling circuit at a location in the fuel cell cooling circuit downstream of the fuel cell but upstream of the coolant/coolant heat exchanger for utilizing the region in the fuel cell cooling circuit with the highest temperature. The temperature of the fuel cell coolant flowing from the fuel cell is then reduced by flow through the evaporator first and then further reduced by subsequent flow through in the coolant/coolant heat exchanger.

Notice in relation to the prior art that the serial flow of the fuel cell coolant through the evaporator first and then through the heat exchanger is different from the disclosure of the above-mentioned WO2017/148487 where the flow through the side branch and the by-passing flow through the evaporator are in parallel and not serial. Also, the evaporator in WO2017/148487 is located between the fuel cell coolant pump and the fuel cell, downstream of the fuel cell coolant pump and upstream of the fuel cell. This is a different configuration.

Optionally, in the case with a main circuit and side branch and a split point and merge point, the fuel evaporator is thermally coupled to the fuel cell cooling circuit at a location in the fuel cell cooling circuit between the fuel cell and the merge point, downstream of the fuel cell but upstream of the merge point. The temperature of the fuel cell coolant downstream of the fuel cell is then first reduced by heat exchange with the evaporator prior to mixing the coolant from the fuel cell with the portion of coolant arriving from the coolant/coolant heat exchanger at lower temperature at the merge point.

In further embodiments, the side branch comprises an adjustment valve that regulates the flow through the side branch. In some embodiments, the adjustment valve is adjustable between a maximum flow level and a minimum flow level that is larger than zero through the adjustment valve and through the side branch. If the flow of fuel cell coolant cannot be closed off by such valve, it is safeguarded that there is always a minimum flow through the side branch, which is a safety measure against sudden overheating of the fuel cell.

Notice in comparison with the prior art, that US9136549 emphasizes in column 8 line 6 that the shutoff valve can be closed. This is so because US9136549 only uses the heat transfer for heating the battery in startup situations or when the temperature of the battery falls under a limit. However, once the battery is heating itself in the system of US9136549, the flow from the fuel cell cooling circuit through the heat exchanger is stopped.

As the fuel cell system typically comprises a controller for controlling the operation of the fuel cell system, including the temperature of the fuel cell, the adjustment valve is advantageously functionally connected to the controller. This is advantageous whether the valve can be closed or whether it can only be adjusted between a minimum level larger than zero and a maximum flow. In the latter case, the automated operation of such valve, the flow is adjusted between the minimum and maximum flow level automatically by the adjustment valve under control by the controller as a measure for controlling the temperature $T_{Mix}$ of the fuel cell coolant in the main circuit upstream of the fuel cell and the steady state fuel cell temperature $T_{FC}$. For example, $T_{Mix}$ is in the range of 10-20 degrees lower than $T_{FC}$.

Although, the singular terms of fuel cell and battery and other components have been used in general, it also includes more than one thereof. For example, it is typical that more than one battery is used in such systems, and more than one fuel cell, namely rather a fuel cell stack.

In some embodiments, the battery circuit comprises additional components. For example, the battery cooling circuit is also used to cool a compressor that is used to pump pressurized air through the fuel cell. Other examples of such components cooled by the battery coolant are electrical converters between direct currents (DC) or between direct current (DC) and alternating current (AC), such a DC/DC converter for converting the DC power from the fuel cell to the correct voltage for the power consuming components, for example the electrical motors of a vehicle for the propulsion, and/or a DC/AC converter for providing the correct electrical power for the compressor.

For example, the compressor is located in the battery cooling circuit between the coolant/coolant heat exchanger and the radiator downstream of the coolant/coolant heat exchanger and upstream of the radiator. This is advantageous, if the operational temperature of the compressor is higher than the temperature of the battery coolant downstream of the coolant/coolant heat exchanger.

Optionally, a converter is located between the battery and the coolant heat exchanger, downstream of the battery and upstream of the coolant/coolant heat exchanger. This is advantageous if the operational temperature of the converter is close to the operational temperature of the battery and lower than the temperature just downstream of the coolant/coolant heat exchanger.

SHORT DESCRIPTION OF THE DRAWINGS

Figure 2:
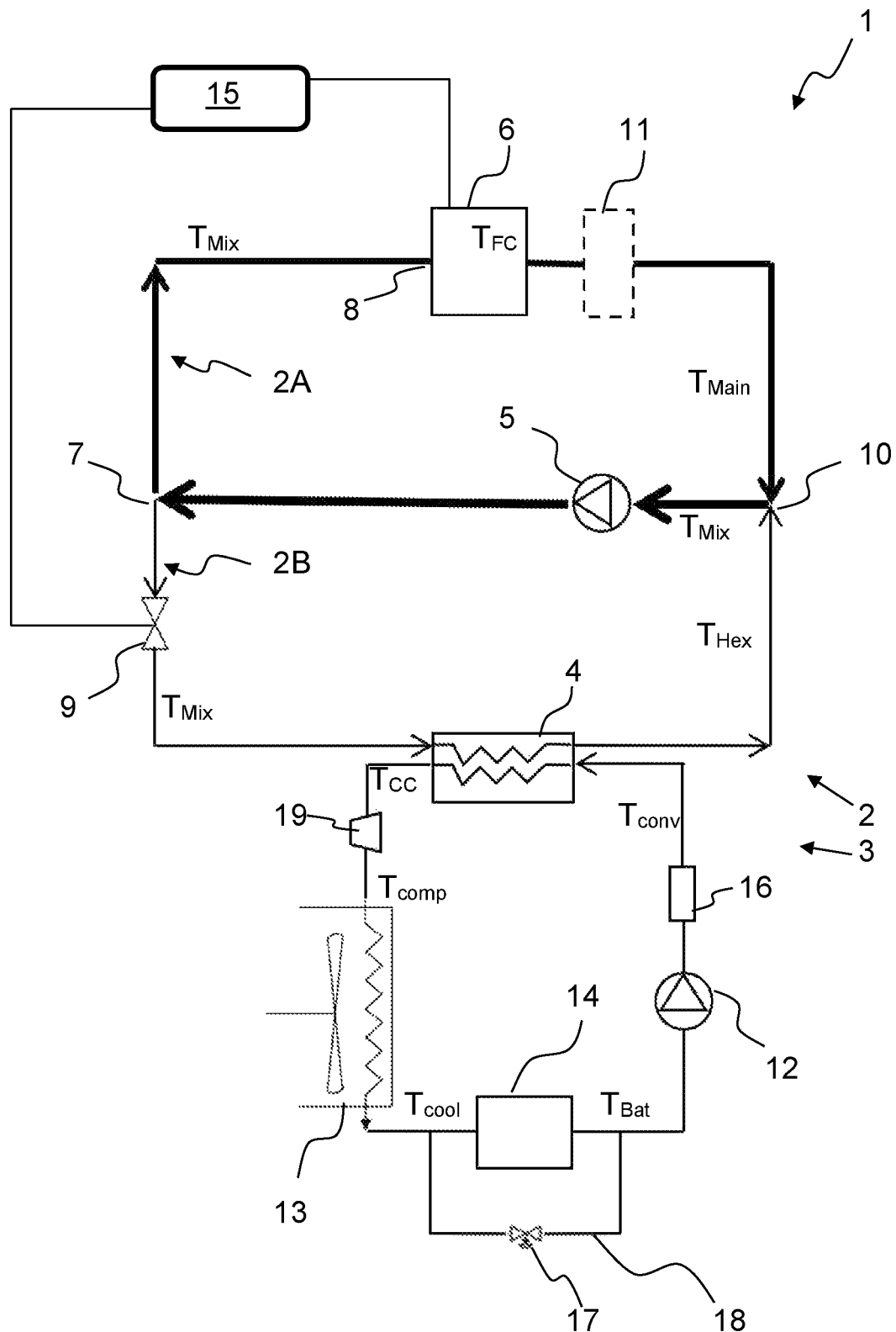

The invention will be explained in more detail with reference to the drawing, where FIG. 1 illustrates an embodiment of a cooling circuit principle FIG. 2 illustrates an alternative cooling circuit arrangement.

DETAILED DESCRIPTION / PREFERRED EMBODIMENT

FIG. 1 illustrates a diagram of a cooling circuit 2 for a fuel cell system 1 in which only some of the components of the fuel cell system 1 are illustrated for convenience and easy overview. The fuel cell cooling circuit 2 is thermally connected to a battery cooling circuit 3 through a coolant/coolant heat exchanger 4. The fuel cell cooling circuit 2 comprises a main circuit 2A, which is show by thick arrows and lines, where the fuel cell coolant flows from the fuel cell coolant pump 5 through the fuel cell 6 and then back to the fuel cell coolant pump 5. The fuel cell cooling circuit 2 also comprises a side branch 2B that divides off the main circuit 2A at a split point 7 downstream of the fuel cell coolant pump 5 at a flow location between the fuel cell coolant pump 5 and the coolant inlet 8 of the fuel cell 6. The fuel cell coolant in the side branch 2B flows through a flow adjustment valve 9, through the coolant/coolant heat exchanger 4 and back to a merging point 10 where the fuel cell coolant from the main circuit 2A and the fuel cell coolant from the side branch 2B merge. The merging point 8 is located upstream of the pump 5 and downstream of the fuel cell at a flow location between the fuel cell 6 and the fuel cell coolant pump 5.

Optionally, an evaporator 11 for evaporation of fuel, for example a mix of methanol and water, is located downstream of the fuel cell 6, between the fuel cell 6 and the merging point 10, which is in the region of the main circuit 2A where the temperature of the fuel cell coolant is highest and evaporation most efficient.

The thinner arrows in the side branch 2B illustrate the lower flow of coolant in the side branch 2B relatively to the main flow in the main circuit 2A. For example, at the split point 7, only a relative amount in the range of 5% to 30% of the flow is divided off the main circuit 2A.

In the battery cooling circuit 3, battery coolant flows through the coolant/coolant heat exchanger 4, advantageously in a counterflow direction relatively to the flow of the fuel cell coolant, as a counterflow configuration yields the highest efficacy for heat exchange. A battery coolant pump 12 pumps the battery coolant serially through the coolant/coolant heat exchanger 4, radiator heat exchanger 13, and the battery 14 before the battery coolant returns to the battery coolant pump 12. The radiator heat exchanger 13 is located upstream of the battery 14 at a location between the heat exchanger 4 and the battery 14 in order for removing heat from the battery coolant, after the battery coolant has taken up heat from both the battery 14 and form the fuel cell coolant in the coolant/coolant heat exchanger 4. The battery coolant pump 12 could be located elsewhere in the battery cooling circuit 3.

At the coolant exit of the fuel cell 6, the fuel cell coolant has the operation temperature $T_{FC}$ of the fuel cell, for example 175° C. It is pointed out that the temperature is an approximative value in the case of a fuel cell stack, as the temperature in a fuel cell stack may vary a few degrees from one end to the other due to the coolant being heated up gradually through the fuel cell stack.

If an evaporator 11 is included in the fuel cell cooling circuit 2, the temperature of the FC coolant is lowered respectively by the evaporator 11, which takes up thermal energy from the fuel cell coolant, resulting in a temperature $T_{Main}$ for the fuel cell coolant in the main circuit 2A upstream of the merge point 10. The side branch provides cooled fuel cell coolant from the heat exchanger 4 at a temperature $T_{Hex}$, for example in the range of 50° C. to 80° C., optionally in the range of 50° C. to 70° C.

The fuel cell coolant flows from the side branch 2B and the main circuit 2A are mixed at the merge point 10, resulting in the fuel cell coolant having a temperature $T_{Mix}$ which is between $T_{Main}$ and $TH_{Hex}$, for example in the range 150° C. to 170° C., such as around 160° C.

Examples of temperatures as indicated in FIG. 1 are as follows:

$T_{FC}$: 120° C. to 200° C., for example in the range of 160 to 185° C.;

$T_{Mix}$: Typically 10-20 degrees lower than $T_{FC}$;

$T_{Main}$: 120° C. to 200° C., for example in the range of 150 to 185° C., depending on whether an evaporator is located downstream of the FC, upstream of the merge point;

$T_{Hex}$: Typically 10-40 degrees above $T_{Bat}$, for example 50° C.-70° C.

$TB_{Bat}$: 25° C.-60° C.

$T_{cool}$: 20° C.-50° C., depending on the air temperature and the necessary cooling temperature of the battery.

As the fuel cell system 1 typically comprises a controller 15 for controlling the operation of the fuel cell system 1, including the temperature of the fuel cell 6, the adjustment valve 9 is advantageously functionally connected to the controller 15.

The illustrated configuration has some peculiarities:

The temperature $T_{Mix}$ of the fuel cell coolant is the same at the inflow 8 to the fuel cell 6 and at the inflow to the coolant/coolant heat exchanger 4.

The main circuit 2A and the side branch 2B are arranged in parallel, being split downstream of the pump 5 and merge again upstream of the pump 5.

There is no radiator in the fuel cell cooling circuit 2 but only in the battery cooling circuit 3, implying that the heat is removed from the fuel cell cooling circuit 2 only by the battery cooling circuit 3.

During startup, the coolant/coolant heat exchanger 4 is used for heating up the battery, which is implicit, as the heat is transferred from the fuel cell cooling circuit 2 to the battery cooling circuit 3.

In some embodiments, in order to safeguard that there is always cooling performance present, the valve 9 may be configured for flow adjustment between a minimum value and a maximum value, where the minimum value is higher than zero. In other words, in this embodiment, the adjustment valve 9 cannot be fully closed. This implies that the adjustment valve 9 can be made relatively simple and light weight without the necessity of being tight with respect to flow through the adjustment valve 9. This reduces costs for the circuit. The fact that such valve would always be open implies no drawback, as a flow through the coolant/coolant heat exchanger 4 is desired not only during normal operation where the battery cooling circuit 3 is used to remove heat from the fuel cell cooling circuit 2, but also in upstart phases, where the heat from the fuel cell 6 is useful for heating the battery 14 quickly to the best operational temperature.

Although, the singular terms of fuel cell and battery and other components have been used in general, it also includes more than one thereof. For example, it is typical that more than one battery is used in such systems, and more than one fuel cell, namely rather a fuel cell stack.

FIG. 2 illustrates an alternative embodiment in which the battery cooling circuit 3 comprises further components. Exemplified as components are a compressor 19 used for pumping air into the system for the fuel cell and an electrical converter 16, for example a DC/DC converter for converting the DC power from the fuel cell 6 to the correct voltage for the power consuming components, for example the electrical motors of a vehicle for the propulsion, and/or a DC/AC converter for providing the correct electrical power for the compressor 19.

For example, the temperature of the battery coolant just downstream of the coolant/coolant heat exchanger 4 is around 60° C. This temperature increases by thermal energy transfer from the compressor to $T_{comp}$, for example to a temperature $T_{comp}$ 10-30 degrees higher than the temperature of the battery coolant just downstream of the coolant/coolant heat exchanger 4, and is then cooled down by the radiator heat exchanger 13 to $T_{cool}$, for example in the range 20-50° C., however, depending on the outside temperature and the operational temperature $TB_{Bat}$ of the battery. The battery heats the battery coolant to a higher temperature $TB_{Bat}$, depending on the optimum operation temperature of the battery 14. Prior to entering the coolant/coolant heat exchanger 4 again, some thermal energy is removed from the converter 16, which heats the battery coolant additionally.

Notice that the position of the pump 12 in the battery cooling circuit 3 is not necessarily as indicated, as the pump 12 can also be installed at other positions in the battery cooling circuit 3.

In order to adjust the battery temperature, a battery bypass 18 is optionally provided, typically with an adjustment valve 17 in the bypass in order to adjust the flow level of the battery coolant through the battery 14. This gives a further degree of freedom to adjust the temperature for the battery relatively to the other components in the battery coolant circuit 3, such as the converter 16 and the compressor 19.

REFERENCE NUMBERS 1 fuel cell system
2 fuel cell cooling circuit
2A main circuit of the fuel cell cooling circuit 1
2B side branch of the fuel cell cooling circuit 1
3 battery cooling circuit
4 coolant/coolant heat
5 fuel cell coolant pump
6 fuel cell
7 split point
8 coolant entrance of fuel cell 6
9 flow adjustment valve
10 merging point
11 evaporator
12 battery coolant pump
13 radiator heat exchanger
14 battery
15 controller
16 converter 17 adjustment valve
18 battery bypass
19 compressor

The invention claimed is:

1. A method for operating a fuel cell system, the fuel cell system comprising
a fuel cell, the fuel cell having a steady state temperature $T_{FC}$ during steady state normal operation after startup;
a fuel cell cooling circuit with fuel cell coolant for cooling the fuel cell, the fuel cell cooling circuit being configured for maintaining the steady state temperature $T_{FC}$ of the fuel cell during the steady state normal operation after startup;
a battery, the battery having a steady state temperature $T_{Bat}$ during the steady state normal operation after startup; wherein $T_{Bat}$ is lower than $T_{FC}$;
a battery cooling circuit with battery coolant for cooling the battery, wherein the battery cooling circuit comprises a thermal-energy-remover for removing thermal energy from the battery coolant for maintaining the steady state temperature $T_{Bat}$ of the battery during steady state normal operation after startup; wherein the battery cooling circuit and the battery coolant are separate from the fuel cell cooling circuit and the fuel cell coolant;
a coolant/coolant heat exchanger thermally coupling the fuel cell cooling circuit with the battery cooling circuit for heat transfer from the fuel cell coolant to the battery coolant, the coolant/coolant heat exchanger comprising a first flow area and a second flow area with a heat conducting separation wall in between, wherein the first flow area is flow-connected to the fuel cell cooling circuit for flow of coolant there through, and wherein the second flow area is flow-connected to the battery cooling circuit for flow of battery coolant there through;
characterized in that the method comprises maintaining the steady state temperature $T_{FC}$ of the fuel cell by removing thermal energy from the fuel cell by transfer of thermal energy from the fuel cell coolant to the battery coolant through the coolant/coolant heat exchanger continuously during normal operation after startup and removing the thermal energy from the battery coolant by the thermal-energy-remover for maintaining $T_{Bat}$ in the battery.

2. The method according to claim 1, wherein the thermal-energy-remover is located in the battery cooling circuit downstream of the coolant/coolant heat exchanger and upstream of the battery and in flow direction between the coolant/coolant heat exchanger and the battery for cooling down the battery coolant down-stream of the coolant/coolant heat exchanger by the thermal-energy-remover before the battery coolant enters the battery when in operation, wherein the method comprises, during steady state operation of the fuel cell system, during a cooling cycle of the battery coolant in the battery cooling circuit, transferring thermal energy from the battery to the battery coolant for maintaining the steady state temperature $T_{Bat}$ in the battery, subsequently transferring further thermal energy from the fuel cell coolant to the battery coolant in the coolant/coolant heat exchanger, and then removing the thermal energy that has been taken up by the battery coolant from the battery and from the fuel cell coolant by using the thermal-energy-remover to reach a cooling temperature $T_{cool}$ of the battery coolant before the battery coolant with the cooling temperature $T_{cool}$ enters the battery again, wherein the cooling temperature $T_{cool}$ is lower than $T_{Bat}$ in order for the coolant to take up thermal energy from the battery.

3. The method according to claim 2, wherein $T_{cool}$ is at least 5 degrees lower than $T_{Bat}$.

4. The method according to claim 2, wherein the thermal-energy-remover comprises or consists of a radiator heat exchanger for removal of thermal energy from the battery coolant by the radiator heat exchanger with ambient air flow through the radiator heat exchanger; wherein the method comprises maintaining the steady state temperature $T_{FC}$ of the fuel cell by removing sufficient thermal energy from the fuel cell cooling circuit to the battery cooling circuit and by release of thermal energy from the battery cooling circuit through the radiator heat exchanger of the battery cooling circuit.

5. The method according to claim 4, wherein only the battery cooling circuit but not the fuel cell cooling circuit comprises a radiator heat exchanger for removal of thermal energy from the battery coolant by the radiator heat exchanger with ambient air.

6. The method according to claim 1, wherein $T_{FC}$ is in the range of 120° C. to 200° C., for example in the range of 160 to 185° C., and $T_{Bat}$ is in the range of 25° C.-60° C.

7. The method according to claim 1, wherein the fuel cell cooling circuit comprises a fuel cell coolant pump for pumping the fuel cell coolant through the fuel cell cooling circuit; wherein the fuel cell cooling circuit comprises a main circuit (2A) and a side branch (2B), wherein the main circuit comprises serial flow in the following order: from the fuel cell coolant pump to a split point, from the split point to the fuel cell, from the fuel cell to a merge point, from the merge point to the fuel cell coolant pump; wherein the side branch (2B) comprises flow in series in the following order: from the split point to the coolant/coolant heat exchanger and from the coolant/coolant heat exchanger to the merge point; wherein the method comprises splitting the fuel cell coolant into two portions at the split point with a first portion through the fuel cell and second portion through the coolant/coolant heat exchanger.

8. The method according to claim 7, wherein the fuel cell system comprises a controller for controlling the operation of the fuel cell system, including the temperature of the fuel cell, wherein the side branch (2B) comprises an adjustment valve that is functionally connected to the controller, wherein the adjustment valve is without shutoff capability and only adjustable between a maximum flow level and a minimum flow level through the adjustment valve and through the side branch (2B), wherein the minimum flow level is only larger than zero, and wherein the method comprises adjusting the flow between the minimum and maximum flow level automatically by the adjustment valve under control by the controller as a measure for controlling the temperature $T_{main}$ of the fuel cell coolant in the main circuit (2A) and the steady state fuel cell temperature $T_{FC}$.

9. The method according to claim 8, wherein $T_{main}$ is in the range of 10-20 degrees lower than $T_{FC}$.

10. The method according to claim 7, wherein the first portion is less than 50% of the second portion.

11. The method according to claim 1, wherein the fuel cell system comprises a fuel evaporator for evaporating fuel, wherein the fuel evaporator is thermally coupled to the fuel cell cooling circuit at a location in the fuel cell cooling circuit downstream of the fuel cell but upstream of the coolant/coolant heat exchanger for utilizing the region in the fuel cell cooling circuit with the highest temperature region; and wherein the method comprises reducing the temperature of the fuel cell coolant flowing from the fuel cell by flow through the evaporator first and subsequently reducing the temperature further by subsequent flow through in the coolant/coolant heat exchanger.

12. The method according to claim 7, wherein the fuel cell system comprises a fuel evaporator for evaporating fuel, wherein the fuel evaporator is thermally coupled to the fuel cell cooling circuit at a location in the fuel cell cooling circuit downstream of the fuel cell but upstream of the coolant/coolant heat exchanger for utilizing the region in the fuel cell cooling circuit with the highest temperature region; and wherein the method comprises reducing the temperature of the fuel cell coolant flowing from the fuel cell by flow through the evaporator first and subsequently reducing the temperature further by subsequent flow through in the coolant/coolant heat exchanger; wherein the fuel evaporator is thermally coupled to the fuel cell cooling circuit at a location in the fuel cell cooling circuit between the fuel cell and the merge point, downstream of the fuel cell but upstream of the merge point; wherein the method comprises, reducing the temperature of the fuel cell coolant downstream of the fuel cell by heat ex-change with the evaporator prior to mixing the coolant from the fuel cell with the coolant from the coolant/coolant heat exchanger at the merge point.

13. A fuel cell system comprising
   a fuel cell;
   a fuel cell cooling circuit with fuel cell coolant for cooling the fuel cell;
   a battery;
   a battery cooling circuit with battery coolant for cooling the battery, wherein the battery cooling circuit comprises a thermal-energy-remover for removing thermal energy from the battery coolant; wherein the battery cooling circuit and the battery coolant are separate from the fuel cell cooling circuit and the fuel cell coolant;
   a coolant/coolant heat exchanger thermally coupling the fuel cell cooling circuit with the battery cooling circuit for heat transfer from the fuel cell coolant to the battery coolant, the coolant/coolant heat exchanger comprising a first flow area and a second flow area with a heat conducting separation wall in between, wherein the first flow area is flow-connected to the fuel cell cooling circuit for flow of coolant there through, and wherein the second flow area is flow-connected to the battery cooling circuit for flow of battery coolant there through;
   characterized in that the thermal-energy-remover comprises or consists of a radiator heat exchanger for removal of thermal energy from the battery coolant by heat exchange with ambient air flow through the radiator heat exchanger, wherein the fuel cell system is configured for maintaining the steady state temperature $T_{FC}$ of the fuel cell by removing sufficient thermal energy from the fuel cell cooling circuit to the battery cooling circuit and by releasing thermal energy from the battery cooling circuit through the radiator heat exchanger of the battery cooling circuit, wherein only the battery cooling circuit but not the fuel cell cooling circuit comprises a radiator heat exchanger for removal of thermal energy from the battery coolant by heat exchange with ambient air.

14. The fuel cell system according to claim 13, wherein the thermal-energy-remover is located in the battery cooling circuit downstream of the coolant/coolant heat exchanger and upstream of the battery and in flow direction between the coolant/coolant heat exchanger and the battery for cooling down the battery coolant downstream of the coolant/coolant heat exchanger by the thermal-energy-remover before the battery coolant enters the battery when in operation, wherein the fuel cell system is configured for, during steady state operation of the fuel cell system, during a cooling cycle of the battery coolant in the battery cooling circuit, transferring thermal energy from the battery to the battery coolant for maintaining the steady state temperature $T_{Bat}$ in the battery, subsequently transfer-ring further thermal energy from the fuel cell coolant to the battery coolant in the coolant/coolant heat exchanger, and then removing the thermal energy that has been taken up by the battery coolant from the battery and from the fuel cell coolant by using the thermal-energy-remover to reach a cooling temperature $T_{cool}$ of the battery coolant before the battery coolant with the cooling temperature $T_{cool}$ enters the battery again, wherein the cooling temperature $T_{cool}$ is lower than $T_{Bat}$ in order for the coolant to take up thermal energy from the battery.

15. The fuel cell system according to claim 13, wherein the fuel cell cooling circuit comprises a fuel cell coolant pump for pumping the fuel cell coolant through the fuel cell cooling circuit; wherein the fuel cell cooling circuit comprises a main circuit (2A) and a side branch (2B); wherein the main circuit (2A) comprises serial flow during operation in the following order: from the fuel cell coolant pump to a split point, from the split point to the fuel cell, from the fuel cell to a merge point, from the merge point to the fuel cell coolant pump; wherein the side branch (2B) comprises flow during operation in series in the following order: from the split point to the coolant/coolant heat exchanger and from the coolant/coolant heat exchanger to the merge point; wherein the fuel cell system is configured for splitting the fuel cell coolant into two portions at the split point with a first portion through the fuel cell and second portion through the coolant/coolant heat exchanger, wherein the first portion is less than 50% of the second portion.

16. The fuel cell system according to claim 15, wherein the fuel cell system comprises a controller for controlling the operation of the fuel cell system, including the temperature of the fuel cell, wherein the side branch (2B) comprises an adjustment valve that is functionally connected to the controller, wherein the adjustment valve is without shutoff capability and only adjustable between a maximum flow level and a minimum flow level through the adjustment valve and through the side branch (2B), wherein the minimum flow level is only larger than zero, and wherein the system is configured for adjusting the flow between the minimum and maximum flow level automatically by the adjustment valve under control by the controller as a measure for controlling the temperature $T_{main}$ of the fuel cell coolant in the main circuit (2A) and the steady state fuel cell temperature $T_{FC}$.

17. The fuel cell system according to 13, wherein the fuel cell system comprises a fuel evaporator for evaporating fuel, wherein the fuel evaporator is thermally coupled to the fuel cell cooling circuit at a location in the fuel cell cooling circuit downstream of the fuel cell but upstream of the coolant/coolant heat exchanger for utilizing the region in the fuel cell cooling circuit with the highest temperature region and for flow of the fuel cell coolant through the evaporator first and subsequently flow through the coolant/coolant heat exchanger and transfer of thermal energy from the fuel cell coolant to the battery coolant.

18. The fuel cell system according to claim 16, wherein the fuel cell system comprises a fuel evaporator for evaporating fuel, wherein the fuel evaporator is thermally coupled to the fuel cell cooling circuit at a location in the fuel cell cooling circuit downstream of the fuel cell but upstream of the coolant/coolant heat exchanger for utilizing the region in the fuel cell cooling circuit with the highest temperature region and for flow of the fuel cell coolant through the evaporator first and subsequently flow through the coolant/coolant heat exchanger and transfer of thermal energy from the fuel cell coolant to the battery coolant; wherein the fuel evaporator is thermally coupled to the fuel cell cooling circuit at a location in the fuel cell cooling circuit between the fuel cell and the merge point, downstream of the fuel cell but upstream of the merge point for reducing the temperature of the fuel cell coolant flowing from the fuel cell by flow through the evaporator first and subsequently reducing the temperature further by subsequent flow through the coolant/coolant heat exchanger at the merge point.

19. The fuel cell system according to claim 13, wherein the system comprises at least one further components in the battery cooling circuit for cooling the component by the battery coolant, the further components including at least one of an air compressor for compressing air as oxygen supply for the fuel cell, and an electrical converter for converting electrical direct current from the fuel cell to an alternating current or to a direct current with a different voltage.

* * * * *

UNITED STATES PATENT AND TRADEMARK OFFICE
CERTIFICATE OF CORRECTION

PATENT NO. : 11,641,019 B1  
APPLICATION NO. : 17/917630  
DATED : May 2, 2023  
INVENTOR(S) : Mads Bang et al.

Page 1 of 1

It is certified that error appears in the above-identified patent and that said Letters Patent is hereby corrected as shown below:

On the Title Page

Item (30) Delete:
"(30) Foreign Application Priority Data
Mar. 31, 2021 (DK)     PA2020-00398".

And Insert:
--(30) Foreign Application Priority Data
Apr. 7, 2020 (DK)     PA2020-00398--.

Signed and Sealed this  
Fifteenth Day of October, 2024

Katherine Kelly Vidal  
*Director of the United States Patent and Trademark Office*